106. COMPOSITIONS, COATING OR PLASTIC.

Patented June 30, 1925.

1,544,421

UNITED STATES PATENT OFFICE.

HARRY D. BAYLOR, OF SELLERSBURG, INDIANA, ASSIGNOR TO LOUISVILLE CEMENT COMPANY, OF LOUISVILLE, KENTUCKY, A CORPORATION OF KENTUCKY.

PLASTER.

No Drawing.  Application filed October 31, 1921. Serial No. 511,872.

*To all whom it may concern:*

Be it known that I, HARRY D. BAYLOR, a citizen of the United States, residing at Sellersburg, in the county of Clark and State of Indiana, have invented certain new and useful Improvements in Plaster, of which the following is a specification.

This invention relates to a new composition of matter for use as a wall plaster.

In my prior Patent No. 1,323,953, dated Dec. 2, 1919, I have described a certain cement product and the process of making the same. This product I have found to be available for the manufacture of a hard wall plaster by the addition thereto of Portland cement, pulverized argillaceous material, preferably shale, dry sand, and a fibrous binding material, such as cattle hair.

The product described in Patent 1,323,953 is produced by intimately mixing aluminate-containing hydraulic cement with quick-lime, adding and simultaneously stirring into the mixture a small percentage of oily or waxy material together with just sufficient water to hydrate the added lime and that which results from the breaking up of the aluminates, and finally comminuting the resulting mass.

This prior cement composition while quite suitable for plastering purposes, has a tendency to work "short", and I have found that by adding the materials above specified, there is produced a hard wall-plaster compound having the advantages hereinafter pointed out.

As a typical example of my new product the following materials are thoroughly mixed in any suitable mixing machine:—
   (1) 50 to 55% of the cement produced under my Patent 1,323,953;
   (2) 15 to 18% of Portland cement;
   (3) 20 to 25% pulverized shale or siliceous clay;
   (4) 4 to 5% of dry screened sand;
   (5) 0.3 to 0.5% of cattle hair or similar binder.

The composition of the first ingredient, stated in percentages of the whole are approximately 40.5 to 44.5% of natural cement; 5 to 5.5% quick lime; 3.75 to 4.25% water of hydration and 0.75 to 0.85% of oily or waxy material.

This first ingredient may be formed by hydrating a mixture of approximately 1620 parts by weight of hydraulic cement containing aluminates and 200 parts by weight of lime with water in quantity sufficient to hydrate both the lime added as such and that which results from the break-up of the aluminates during the hydration in the presence of about 30 parts by weight of an oily or waxy material.

This plaster mixture showed upon test an initial set of five hours, and a tensile strength of seventy-five pounds per square inch in seven days. The plaster made in accordance with my invention possesses to a remarkable degree the qualities of plasticity or fastness, thereby permitting the workmen to spread a maximum yardage with a minimum effort, and its relatively slow setting characteristic permits the workmen to continue their work without the danger of the plaster taking a flash set before they have time to draw the work. This slow setting quality also gives this plaster a great advantage in that large batches can be mixed at one time and then retempered if necessary.

Having cement as the main component, this plaster is therefore of such nature that it will continue to grow in strength until the ultimate strength of the cement has been reached, which is a permanent strength. In the case of most present day plasters the ultimate strength is reached within a few days, but it immediately begins to deteriorate until after a period of a few years it possesses very little strength.

The presence of the waxy material in conjunction with the finely pulverized shale renders the mortar made from this plaster water-proof to a great degree, thus enabling the plaster, when set, to keep out dampness. The finely pulverized shale particularly increases the plasticity of and adds to the spreading effect of the plaster. This plaster is of especial utility where it is desirable to use metal lath, as there is no sulfuric acid component to affect the metal, as is the case when gypsum plasters are used.

Experience has proven that aside from the foregoing qualities of this plaster, it has a great sand carrying capacity, thereby making it a very economical building material.

In the appended claims oily and waxy materials suitable for use in the compositions of my invention are designated as organic, plastic, water-repellent substances.

I claim:

1. A composition of matter for the production of plaster comprising in admixture Portland cement, sand, finely divided argillaceous material, a fibrous material, and a cement comprising hydrated natural cement and lime intimately mixed with an organic, plastic, water-repellent substance.

2. A composition of matter for the production of plaster as defined in claim 1 in which the finely divided argillaceous material is pulverized shale.

3. A composition of matter for the production of plaster as defined in claim 1 in which the fibrous material is cattle hair.

4. A composition of matter for the production of plaster as defined in claim 1 in which the finely divided argillaceous material is pulverized shale and the fibrous material is animal hair.

5. A composition of matter for the production of plaster comprising in admixture Portland cement, sand, finely divided argillaceous material, a fibrous material, and a cement such as may be prepared by hydrating a mixture of hydraulic cement and lime in the presence of an organic, plastic, water-repellent substance.

6. A composition of matter for the production of plaster comprising in admixture 15 to 18% of Portland cement, 20 to 25% of a finely divided argillaceous material, 4 to 5% of dry screened sand, 0.3 to 0.5% of a fibrous material, and 50 to 55% of a cement comprising approximately 40.5 to 44.5 parts by weight of a natural hydraulic cement, 5 to 5.5 parts by weight of lime, 3.75 to 4.25 parts by weight of water of hydration and 0.75 to 0.85 parts by weight of organic, plastic, water-repellent substance.

7. A composition of matter for the production of plaster comprising in admixture 15 to 18% of Portland cement, 20 to 25% of pulverized shale, 4 to 5% of dry screened sand, 0.3 to 0.5% of animal hair, and 50 to 55% of a cement such as may be prepared by hydrating a mixture of approximately 1620 parts by weight of a hydraulic cement containing aluminates and 200 parts by weight of lime with water in quantity sufficient to hydrate both the lime added as such and that which results from the break-up of the aluminates during the hydration in the presence of about 30 parts by weight of an organic, plastic, water-repellent substance.

8. A composition of matter for the production of plaster comprising in admixture 15 to 18% of Portland cement, 20 to 25% of a finely divided argillaceous material, 4 to 5% of sand, 0.3 to 0.5% of a fibrous material, and 50 to 55% of a cement comprising organic, plastic, water-repellent substance and hydrated natural hydraulic cement and lime.

In testimony whereof, I affix my signature.

HARRY D. BAYLOR.